United States Patent [19]
Rose

[11] 3,881,822
[45] May 6, 1975

[54] METHOD FOR DETERMINING CHRYSOTILE (ASBESTOS) IN THE TALC

[75] Inventor: Harry A. Rose, Indianapolis, Ind.

[73] Assignee: Eli Lilly and Company, Indianapolis, Ind.

[22] Filed: Dec. 26, 1973

[21] Appl. No.: 427,778

[52] U.S. Cl................................... 356/36; 356/201
[51] Int. Cl. ........................................... G01n 21/22
[58] Field of Search ............. 356/36, 179, 180, 201

[56] References Cited
UNITED STATES PATENTS
3,563,653  2/1971  Chen.................................... 356/36

Primary Examiner—Ronald L. Wibert
Assistant Examiner—Matthew W. Koren
Attorney, Agent, or Firm—Ralph W. Ernsberger; Everet F. Smith

[57] ABSTRACT

A method is provided for determining the chrysotile content of talc comprising measuring the preferential adsorption of a sulfonphthalein dye, such as bromcresol purple (5,5-dibromo-o-cresolsulfonphthalein) by chrysotile but not by talc. The final measurement is a spectophotometric determination of the dye remaining in solution after the adsorption step.

12 Claims, 1 Drawing Figure

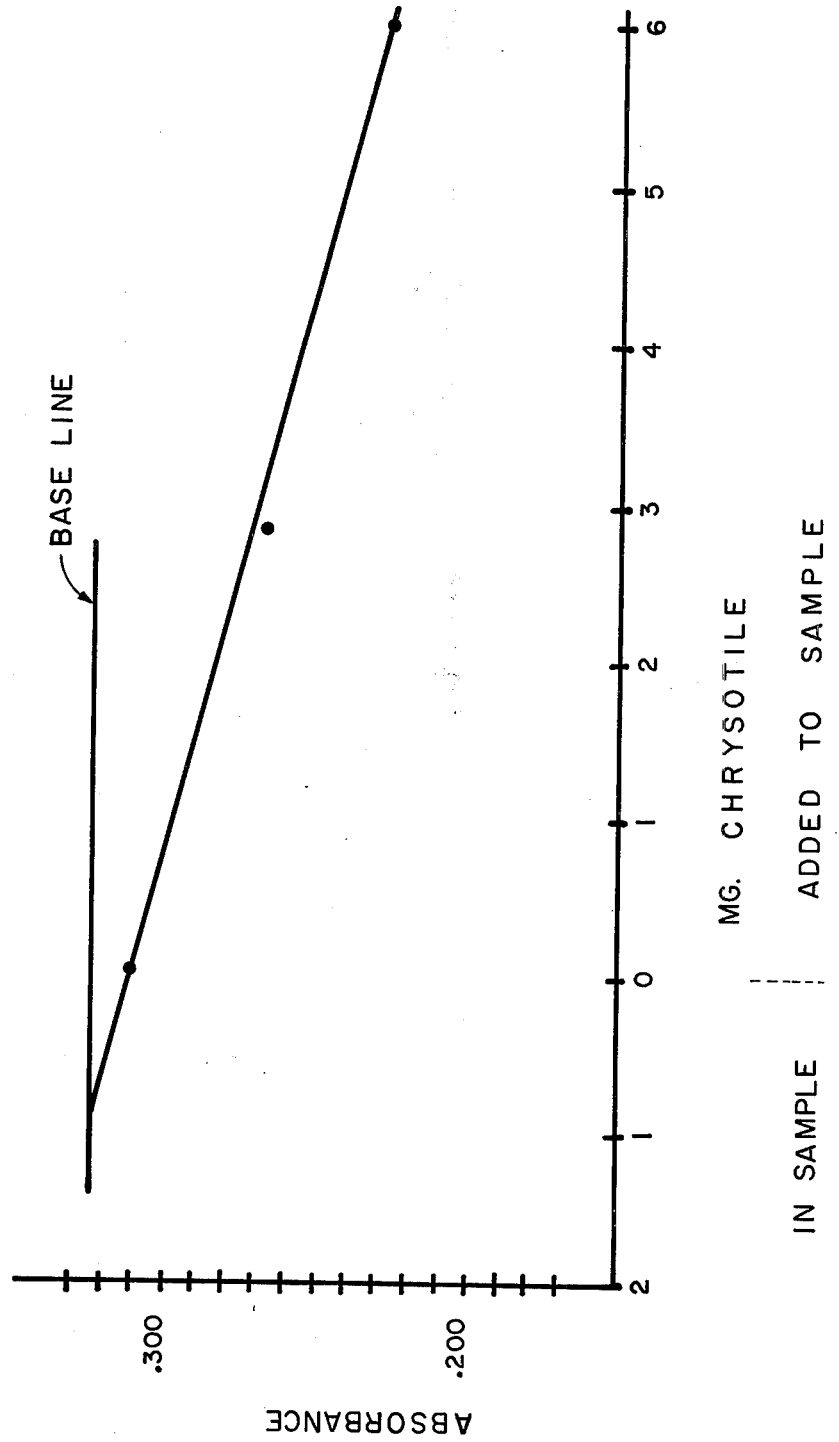

METHOD FOR DETERMINING CHRYSOTILE (ASBESTOS) IN THE TALC

BACKGROUND OF THE INVENTION

1. Field of the Invention

This invention relates to an analytical chemistry method involving spectophotometry. More particularly, this invention relates to a method for determining the chrysotile content of talc by preferentially adsorbing a sulfonphthalein dye on the chrysotile and determining the uptake of such dye by spectophotometric measurements.

2. Description of the Prior Art

Talc is widely used in cosmetics and pharmaceuticals. When utilized as a diluent in pharmaceutical capsules and tablets the talc is ingested by those taking the medicine.

Talc is a hydrated magnesium silicate which may be ideally represented as $Mg_3(OH)_2Si_4O_{10}$. It is often contaminated with other minerals such as quartz, dolomite, chlorite, and the various forms of asbestos. Asbestos in talc has been implicated recently by at least one investigator as a cause of stomach cancer in Japan. [Merliss, R. R., *Science*, 173, 1141–1142, (1971)]. Of the asbestos minerals, chrysotile is currently of most physiological concern.

Chrysotile is also a hydrated magnesium silicate which may be ideally represented as $Mg_6(OH)_8Si_4O_{10}$. The two minerals differ in their physical structure; talc being made up of more or less flat sheets of oxygen and hydroxyl moieties interspersed with magnesium and silicon atoms. Each composite sheet is said to be electrically neutral. On the other hand, chrysotile has a serpentine structure with an infinite number of cross-linked $(Si_2O_5)^{2-}$ moieties and comprises a macro-anion.

Several procedures have been proposed for determining the chrysotile content of talc. Mainly, these have been directed to such methods as X-ray diffraction and microscopic examination. X-ray diffraction becomes very uncertain at low percentages of chrysotile in the talc. And optical microscopic examination suffers because the particles approach the limit of resolution of the instrument.

Accordingly, it is an object of this invention to provide a simple accurate spectophotometric method for the determination of the concentration of chrysotile in talc.

Still another object of this invention is to provide a spectophotometric method for the determination of the chrysotile content of talc which is reproducible through the use of an internal standard method obviating the need for a standard calibration chart.

SUMMARY

It has now been discovered that chrysotile will quantitatively adsorb such sulfonphthalein dyes as bromphenol blue, bromothymol blue, bromcresol green, bromcresol purple, cresol red, and thymol blue in the presence of talc with no adsorption of such dyes by the talc. The analytical method based on this fact involves preparing a working solution of one of such dyes and spectrophotometrically measuring the adsorbance of such dye from the solution. Three samples of the talc to be analyzed for the chrysotile content are accurately weighed and to two of these samples are added accurately weighed differing quantities of chrysotile and homogenous blends of such admixtures prepared. The three samples are each contacted by the dye solution and thoroughly mixed. An aliquot of the supernatant from each sample is subjected to a spectrophotometric absorbance measurement and such absorbances are plotted against the quantity of chrysotile added. By extrapolation to a baseline, the level of which is indicated by a blank, the chrysotile content of the talc is determined.

BRIEF DESCRIPTION OF THE DRAWING

The accompanying drawing is a graph depicting an illustrative curve obtained by plotting the residual absorbance of a working solution of a sulfonphthalein dye after contact with a sample of chrysotile containing talc against the quantity of chrysotile added to such sample and extrapolating such curve to the baseline absorbance of such working solution.

DESCRIPTION OF THE PREFERRED EMBODIMENTS

The novel method of this invention comprises selectively adsorbing a sulfonphthalein dye selected from the class consisting of bromphenol blue, bromthymol blue, bromcresol green, bromcresol purple, cresol red, and thymol blue quantitatively on chrysotile in the presence of talc by contacting such chrysotile containing talc with a solution of such dye and spectrophotometrically measuring the absorbance of such solution following such contact and graphically relating such absorbance with the absorbance of such solution before such contact. Such dyes are not adsorbed by talc.

The sulfonphthalein dyes enumerated above by their common names are chemically described as follows:

| Common Name | Chemical Name |
| --- | --- |
| Bromphenol blue | 3,3',5,5'-tetrabromophenol-sulfonphthalein |
| Bromthymol blue | 3,3'-dibromo-thymolsulfonphthalein |
| Bromcresol green | 3,3',5,5'-tetrabromo-m-sulfonphthalein |
| Bromcresol purple | 5,5'-dibromo-o-cresolsulfonphthalein |
| Cresol red | o-cresolsulfonphthalein |
| Thymol blue | thymolsulfonphthalein |

The useful method of the instant invention follows the steps of:

a. dissolving a sulfonphthalein dye selected from the class consisting of bromphenol blue, bromthymol blue, bromcresol green, bromcresol purple, cresol red, and thymol blue in an appropriate water miscible solvent and diluting such solution with an equal volume of water;

b. diluting the solution from a) with an acidic buffer to a concentration that will yield after further dilution in the test procedure an absorbance of from about 0.15 to about 0.75 at a wavelength consistent with the dye being utilized;

c. weighing accurately three samples of the talc to be analyzed to similar weights to the nearest 0.0010 g;

d. adding to one of the three samples from (c) an accurately weighed quantity of chrysotile equal to from about 0.5 to about 2.5 percent by weight of such sample;

e. adding to a second of the three samples from (c) an accurately weighed quantity of chrysotile equal to about twice the concentration by weight added to the sample in (d);

f. adding to the third of the three samples from (c) and to the sample prepared in (d) and (e) a volume of a 1:1 solution of ethanol-water equal to at least twice the quantity of such sample;

g. providing a blank comprised of a volume of a 1:1 solution of ethanol-water equal to the volume of such solution added to each of the three samples in (f);

h. subjecting the samples from (f) and the blank from (g) to an ultrasonic treatment for about two minutes;

i. cooling the ultrasonically treated samples and blank from (h) to room temperature;

j. adding a portion of the dye solution from (b) to each of the ultrasonic treated samples and blank from (i) in a volume equal to the volume of the 1:1 ethanol-water solution added to such samples and used as the blank;

k. mixing such dye solution thoroughly with such samples and blank and allowing the dispersions produced thusly to stand for about 30 minutes;

l. separating the liquid from the dispersions of (k) by first centrifuging and then filtering to remove all suspended solids leaving a clear filtrate;

m. removing an aliquot from the filtrate of (l) and diluting such aliquot with about 1.5 volumes of an acidic buffer;

n. measuring the optical absorbance of the diluted filtrate of (m) at a wavelength appropriate to the dye utilized in a suitable spectrophotometer;

o. plotting the absorbance against the amount of chrysotile added;

p. extrapolating a best fitting straight negative regression line to a baseline established as the absorbance of the blank of (g); and q. determining the chrysotile concentration by reading the indicated chrysotile content at the point where the negative regression line intersects the baseline.

The useful sulfonphthalein dye selected from the class defined hereinbefore can be dissolved in such water miscible solvents as methanol, ethanol, isopropanol, acetone, and the like, preferably ethanol. Generally from about 0.05 g to about 0.5 g of such dye is dissolved in about 150 ml to about 400 ml of the chosen solvent making a solution of from about 0.0125 to about 0.33 percent sulfonphthalein dye. After such dye is in solution an addition of water is made to provide a stock dye solution of from about 0.01 to about 0.1 percent, preferably about 0.03 percent.

The stock solution is further diluted for use by taking an aliquot and adding additional water miscible solvent, water and an acidic buffer to provide a concentration of dye that will yield, after further dilution in the test procedure an absorbance of from about 0.15 to about 0.75 at a wavelength appropriate for the dye being used. Typically about 20 ml of the stock solution is diluted with about 40 ml of the chosen water miscible solvent and sufficient pH 4.2 acetate buffer to a total volume of about 250 ml. In the case of bromcresol purple such a solution will have an absorbance of 0.325 at $422\mu$ at a final concentration w/v of about 0.0012 percent.

Other useful sulfonphthalein dyes yielded the following absorbances when prepared in solutions as described above.

| Dye | Percent Concentration Weight/Volume | Absorbance/Wavelength m$\mu$ | |
|---|---|---|---|
| Bromphenol blue | Not determi.. .. | Not determined | |
| Bromthymol blue | 0.004 | 0.200 | 432 |
| Bromcresol green | 0.004 | 0.174 | 436 |
| Cresol red | 0.004 | 0.364 | 434 |
| Thymol blue | 0.004 | 0.222 | 438 |

It is preferred to work with relatively small samples of talc. Amounts of from about 0.1 g to about 0.5 g generally providing sufficient material for reliable analysis. Typically 0.2 g of talc is a convenient quantity. Large samples can also be employed but usually offer little advantage. The weighing of the samples should be done on a good analytical balance with an accuracy and precision of no less than 0.0010 g.

In the useful process of this invention a minimum of three samples of talc are required. More can be utilized, but little if any benefit accrues from increasing the number of samples beyond three. It is a decided benefit, however, to weigh each of the three samples to similar quantities, plus or minus 0.001 g. While such similarity of weights makes it simple to utilize this process, it is not imperative to have such precision as corrections can be made mathematically before plotting the absorbances on the graph. A highly useful sample weight is 0.2000 ± 0.0010 g.

One of the three samples discussed immediately above is utilized without the addition of pure chrysotile and to the other two samples are added sufficient pure chrysotile to cause a significant variation in the absorbance of the dye from the solution with which the sample is contacted. A typical addition of chrysotile requires that each sample receive a different quantity and it is a desirable situation to add one quantity which is twice the other. That makes the arithmetic plotting simple and straightforward. Other ratios can be used and the eventual results will be of similar reliability, but to do so only complicates the process. In practice it is desirable to add chrysotile in quantities which will adsorb sufficient dye to reduce the absorbance by from about 10 to about 50 percent. It was found that by adding 3 mg and 6 mg respectively of chrysotile to 0.2000 g samples of talc containing about 0.5 percent chrysotile reliable and reproducible determinations were obtained when such samples were contacted with the working solution of bromcresol purple as described hereinbefore. Other concentrations can be employed with equal reliability, for example, an amount of chrysotile equal to from about 0.5 to about 5.0 percent of the talc in the sample can be added to the latter and accurate absorbances measured from such additive samples. In any event, in plotting the absorbances it is advantageous to make the plot absorbance v quantity to obtain an interpolation of the quantity of chrysotile in the "unspiked" sample, which of course can then be converted to a percentage figure in the usual way.

After the accurately weighed chrysotile has been added to each of the two samples to be "spiked", those two samples and the third "unspiked" sample are all treated with a volume of a 1:1 solution of the water miscible solvent employed in dissolving the dye and water equal to from 10 to 100 fold the weight of the sample. In addition a volume of such solution equal to that added to the three samples is provided as a blank. Then all (four) of the thus provided samples are given an ultrasonic treatment for two minutes. When samples of 0.2000 g of talc were employed, 10 ml of a 1:1 solution of 95 percent ethanol and water were added to each sample, a blank of an equal volume provided, and all four volumes were treated ultrasonically for 2 minutes at 70 watts of power.

After the thus treated samples have cooled to room temperature, a volume of the working dye solution described hereinbefore is added to each sample in an amount equal to the 1:1 solvent-water solution added thereto. The samples containing the dye are mixed thoroughly and allowed to stand and settle for 30 minutes.

After the mixed samples have settled, the supernatant is centrifuged from the solids and the separation completed by filtration. It was found that, because of the fineness of the particles in the sample, a simple filtration was inappropriate because the pores of the filter medium clogged and no flow was observed after a short time. While any fine filter paper is suitable it was found that a filter having about $0.45\mu$ pores was eminently satisfactory for preparing the sample for spectroscopy.

An aliquot of the clear filtrate is removed and diluted with 1.5 volumes of a pH 4.2 acetate buffer and the absorbance determined at the wavelength appropriate for the dye employed. When bromocresol purple was used the absorbance was determined at 422 $\mu$ in a Beckman model DU spectrophotometer. Other makes and models of spectrophotometers known to those skilled in the art are equally adaptable to the determination of the absorbance.

The absorbance is determined on the filtrate from each of the two chrysotile spiked samples, the unspiked sample and the blank. The four readings are then plotted on arithmetic paper. While it is generally not important as to which of the elements is plotted as the abscissa and ordinate, it is convenient to plot the mg chrysotile added as the abscissa and the absorbance as the ordinate. The absorbance obtained on the blank is plotted as the baseline and the points plotted for the absorbances of the three samples are connected by a best fitting straight line and such line is extrapolated as a negative regression line to the baseline. The mg chrysotile indicated on the abscissa at the point of intersection between the negative regression line and the baseline is taken as the chrysotile content of the unspiked sample. A conversion to a percent figure can be made in the usual way.

The accompanying graph depicts the actual construction of the graph to determine the chrysotile content of a typical talc sample analyzed as described in Example 1.

EXAMPLE 1

A stock solution of bromcresol purple was prepared by dissolving 0.15 g of the dye in 250 ml of 95 percent ethanol and diluting such solution to 500 ml with water.

Twenty milliliters of the thus prepared stock was diluted to 250 ml by first adding 40 ml of 95 percent ethanol and then adding sufficient pH 4.2 acetate buffer to make the 100 ml volume. This working dye solution was designed to yield an absorbance of 0.325 at 422 $\mu$, after being further diluted 5 to 1 in the course of the test procedure described immediately below.

Pure chrysotile obtained from the Johns Manville Research Center, Manville, New Jersey 08835, was obtained for use in spiking the samples of talc to be analyzed.

Three $0.2000 \pm 0.0010$ g samples of talc were precisely and accurately weighed. One of the three samples was set aside to be analyzed without the addition of spiking chrysotile. To one of the two remaining samples were added 3 mg of chrysotile and to the third sample were added 6 mg of chrysotile, both precisely and accurately weighed.

To the two spiked and one unspiked samples of talc were added 10 ml of a 1:1 95 percent ethanol water solution. There was also provided a blank sample of 10 ml of such solution. The three samples and the blank were given an ultrasonic treatment at 70 watts for 2 minutes. Then the treated samples and blank were cooled to room temperature.

To each of the cooled samples and blank were added 10 ml of the working bromcresol purple dye solution described above. Then the samples and blank were thoroughly mixed and allowed to settle for about 30 minutes, after which each was centrifuged. Following centrifugation, each of the liquids from the three samples and the blank were filtered through a $0.45\mu$ millipore filter. A 10 ml aliquot of each filtrate was diluted to 25 ml with pH 4.2 acetate buffer.

Optical absorbances were then determined at 422 $\mu$ on each of the four diluted filtrates employing a Beckman model DU spectrophotometer. The sample representing the blank had an absorbance of 0.325. The unspiked talc sample had an absorbance of 0.310, and the 3 mg and 6 mg chrysotile spiked talc samples had absorbances of 0.268 and 0.228 respectively. Plotting the mg chrysotile $v$ absorbance on arithmetic paper yielded an indicated 1 mg of chrysotile as being present in the unspiked talc sample. This was equivalent to 0.5 percent.

What is claimed is:

1. A method for determining the chrysotile content of talc comprising: first, contacting said chrysotile containing talc with a solution of a sulfonphthalein dye selected from the class consisting of bromphenol blue, bromthymol blue, bromcresol green, bromcresol purple, cresol red, and thymol blue, and measuring the optical absorbance of said solution both before and after contact with said talc; second, contacting at least two additional samples of said talc, to which additional differing accurately weighted quantities of chrysotile have been added, with a solution of said sulfonphthalein dye, and measuring the absorbance of each of said dye solutions after said contact; third, graphically relating on an arithmetic scale the quantity of chrysotile added to said talc to the absorbance thus measured; and fourth, extrapolating a negative regression line through the points located on said graph to an intersection with a baseline representing the optical absorbance of said dye solution before contact with such talc, said intersection point indicating the chrysotile content of the talc.

2. The method of claim 1 wherein said solution is prepared by dissolving said sulfonphthalein dye in a water miscible solvent selected from the class consisting of methanol, ethanol, isopropanol and acetone to a conentration of from about 0.0125 to about 0.33 percent and then further diluting said solution with water and an acidic buffer to provide a dye solution that will yield an absorbance of from about 0.15 to about 0.75 at a wavelength appropriate to said dye after an additional 5:1 dilution in the course of the test procedure.

3. The method of claim 2 wherein said water miscible solvent is ethanol.

4. The method of claim 2 wherein said acidic buffer is an acetate buffer at about pH 4.2.

5. The method of claim 1 wherein said sulfonphthalein dye is bromcresol purple.

6. The method of claim 5 wherein said bromcresol purple is diluted to a final concentration having an absorbance of about 0.325 at a wavelength of about 422 m$\mu$.

7. The method of claim 1 wherein said solution is in contact with said chrysotile containing talc for about 30 minutes.

8. A method for determining the chrysotile content of talc comprising the steps of:
   a. dissolving a sulfonphthalein dye selected from the class consisting of bromphenol blue, bromthymol blue, bromcresol green, bromcresol purple, cresol red, and thymol blue in a suitable water miscible solvent and diluting the resulting solution with an equal volume of water;
   b. diluting the solution from (a) with an acidic buffer to a concentration that will yield an absorbance of from about 0.15 to about 0.75 at a wavelength consistent with the dye selected after a further 5:1 dilution during the course of the test procedure;
   c. weighing accurately three samples of talc to be analyzed to similar weights to the nearest 0.0010 g;
   d. adding to one of the three samples from (c) an accurately weighted quantity of chrysotile equal to from about 0.5 to about 2.5 percent by weight of said sample;
   e. adding to a second of the three samples from (c) an accurately weighted quantity of chrysotile equal to about twice the concentration by weight added to the sample in (d);
   f. adding to the third of the three samples from (c) and to the samples prepared in (d) and (e) a volume of a 1:1 solution of 95 percent ethanolwater equal V/W to at least twice the weight of said sample;
   g. providing a blank comprised of a volume of a 1:1 solution of 95 percent ehtanol-water equal to the volume of said solution added to each of the three samples in (f);
   h. subjecting the samples from (f) and the blank from (g) to an ultrasonic treatment for about two minutes;
   i. cooling the ultrasonically treated samples and blank from (h) to room temperature;
   j. adding a portion of the dye solution from (b) to each of the ultrasonic treated samples and blank from (i) in a volume equal to the volume of the 1:1 ethanol-water solution added to said samples and used as the blank;
   k. mixing said dye solutions thoroughly with said samples and blank and allowing the dispersions produced thusly to stand for about 30 minutes;
   l. separating the liquid from the dispersions of (k) by first centrifuging and then filtering to remove all suspended solids leaving a clear filtrate;
   m. removing an aliquot from each of the filtrates of (l) and diluting said aliquots with about 1.5 volumes of an acidic buffer;
   n. measuring the optical absorbance of each of the diluted filtrates of (m) at a wavelength appropriate to the dye utilized in a suitable spectrophotometer;
   o. plotting the absorbance against the amount of chrysotile added;
   p. extrapolating a best fitting straight negative regression line to a baseline established as the absorbance of the blank of (g); and
   q. determining the chrysotile concentration by reading the indicated chrysotile content at the point where the negative regression line intersects the baseline.

9. The method of claim 8 wherein the water miscible solvent of (a) is selected from the class consisting of methanol, ethanol, isopropanol and acetone.

10. The method of claim 9 wherein the water miscible solvent is ethanol.

11. The method of claim 8 wherein the sulfonphthalein dye is bromcresol purple.

12. The method of claim 8 wherein the acidic buffer of b) and m) is an acetate buffer at a pH of about 4.2.

* * * * *